United States Patent Office 2,986,516
Patented May 30, 1961

2,986,516

PRESERVED LECITHIN-CONTAINING COMPOSITIONS

William A. Reddie, Houston, Tex., assignor to Magnet Cove Barium Corporation, Houston, Tex., a corporation of Arkansas No Drawing. Filed July 23, 1956, Ser. No. 599,345

12 Claims. (Cl. 252—8.5)

This invention relates to inhibiting the deterioration of the emulsifying powers of lecithin which is dispersed on a solid adsorptive carrier. In another of its aspects, it relates to lecithin-containing dry concentrates for preparing emulsion well fluids wherein the emulsion stabilizing power of the lecithin is effectively preserved during storage of the dry concentrates by the addition thereto of a preselected preservative.

In co-pending applications Serial No. 456,629, filed September 16, 1954, now U.S. Patent No. 2,885,358, and Serial No. 575,326, filed April 2, 1956, there are disclosed certain dry, free-flowing concentrates. These concentrates are used to prepare invert (water-in-oil) emulsions useful in certain well operations. The concentrates contain, among other constituents, an adsorbent carrier material and lecithin. The purpose of the lecithin is to aid in the stabilization of the emulsion formed from the concentrate. The concentrates are prepared at a central manufacturing point and then, upon bagging, may be stored for varying periods of time before they are used. The storage conditions may vary from sub-freezing temperatures to 120° F. or even higher depending upon the location and season.

It has been found that upon storage of the concentrate containing the lecithin, the lecithin will, after a period of time, lose its emulsion stabilizing power. This is rather surprising since chemically pure lecithin is reported as being stable at the temperatures prevailing during the storage of the concentrate. At this point, it should be pointed out that commercial lecithin contains approximately equal quantities of lecithin and cephalin dissolved in soy bean oil. The phosphatides make up about 60 to 65% and the soy bean oil about 35 to 40% of the mixture. As the terms are used in this specification and claims, "lecithin" will be understood to include both the commercial lecithin and pure lecithin per se. When a distinction is to be drawn between commercial lecithin and pure lecithin, they will be referred to in those terms. Also, when reference is made to lecithin "decomposing" or to the "decomposition" of lecithin, it will be understood to mean that the emulsifying or emulsion stabilizing power of the lecithin has decreased irrespective of whether there has been any decomposition of the lecithin in a chemical sense.

As indicated above, pure lecithin is reported to be stable up to a temperature considerably in excess of 120° F. It is true that in the food field, commercial lecithin has been reported to decompose. However, the ingredient of the commercial lecithin which decomposes is not the pure lecithin but the linolenic acid which forms a part of the soy bean oil carrier.

Since it is commercially necessary that the concentrates above referred to be stored for varying periods of time up to say, for example, one year, the lecithin contained therein must either be prevented from decomposing or it must be supplied as a separate liquid ingredient. The latter is not feasible because it complicates the formation of the emulsion well fluid at the well site.

It is accordingly an object of this invention to provide a composition wherein lecithin is dispersed on an adsorptive carrier and wherein decomposition or deterioration of the lecithin during storage is substantially lessened by the addition of certain preselected preservatives.

Another object of the invention is to provide a dry, free-flowing, lecithin-containing concentrate for preparing emulsion well fluids which concentrate can be stored for extended periods of time under different atmospheric conditions without the lecithin losing substantially any of its emulsifying or stabilizing powers.

Another object of the invention is to provide a composition comprising lecithin dispersed on a finely divided solid carrier having considerable adsorption capacity and also including a preselected preservative for preventing the lecithin from deteriorating in its emulsifying or stabilizing powers, the preservative being selected from a class of materials which can be generally described as phenolic in nature.

Other objects, advantages and features of this invention will be apparent to one skilled in the art upon reading this written specification and the appended claims.

In accordance with this invention, it has been found that lecithin which has been dispersed upon an adsorbent carrier, such as clay, can be prevented from losing its emulsifying or stabilizing powers during storage by the addition of one or more of a compound or preservative selected from the group consisting of (a) phenylphenol; (b) alkali metal (sodium, potassium or lithium) phenylphenate; (c) para,para'-isopropylidenediphenol; (d) phenol; (e) a mixture of mono-, di- and tri-(alpha-methylbenzyl)phenol; (f) phenyl mercaptan; (g) para-aminophenol; (h) octylphenol; (i) N,N',N''-trichloro-2,4,6-triamine-1,3,5-triazine; (j) 1,2,4-hexylresorcinol; (k) a mixture of phenyl mercuric acetate and an alkali metal phenylphenate; (l) tricresyl phosphate; (m) 2,2'-methylenebis (4-ethyl-6-tert-butylphenol); (n) butylphenol; (o) 2,3,4,6-tetrachlorophenol; (p) creosote; (q) orthobenzylparachlorophenol; and (r) dihydroxydichlorodiphenylmethane.

Various of these compounds have been classified as bactericides and others as anti-oxidants. It has been suggested that the decomposition of lecithin while dispersed on a solid adsorptive carrier may be due to either bacterial action or oxidation. However, neither of these suggestions in and of themselves is apparently the answer to the reason for the decomposition. Thus, some dry dispersions in which the lecithin has decomposed have been analyzed for bacteria and found to be sterile. As to oxidation, many dispersions in which the lecithin has decomposed have also contained Sterox CD (polyoxyethylene ester) which is a powerful anti-oxidant. Further, many reportedly good bactericides, anti-oxidants and combination bactericides-anti-oxidants have been tried and found incapable of preserving the lecithin.

Of the preservatives listed in the above group, p-phenylphenol, p,p'-isopropylidenediphenol, the mixture of mono-, di- and tri-(alpha-methylbenzyl)phenol, tricresyl phosphate and phenol are preferred. It should be pointed out, however, that this preference is based on the fact that some of these preferred preservatives are cheaper than others while having about the same preserving effect while others of the preferred preservatives, though more expensive, have greater preserving power than the others. All of the preservatives disclosed are satisfactory for preserving the emulsifying powers of the lecithin in the dry dispersion for a minimum of six months at either room temperature or at an elevated temperature of approximately 110° F.

The amount of preservative to be employed should be an amount effective to prevent substantial deterioration of the emulsifying powers of the lecithin when the latter is stored in a dispersed state on an adsorbent carrier for a period of several months and at temperatures within the range of 0° F. to 125° F. When the lecithin and carrier form a part of a dry, free-flowing concentrate for the preparation of emulsion well fluids, the effective amount of preservative should be such that upon the concentrate being stored for a period of six months or more at temperatures within the aforesaid range, the concentrate can be used to prepare invert emulsions having a fluid loss of 2.0 cc. or less. With regard to the preservatives herein disclosed, it has been found that such effective amounts will vary somewhat with the different preservatives. Thus, preservatives (a) to (n), inclusive, should be present in the concentrate in an amount of at least 0.2% by weight of the lecithin, preservative (o) in an amount of at least 10% by weight of the lecithin, preservative (p) in an amount of at least 20% by weight of the lecithin and preservatives (q) and (r) in an amount of at least 0.1% by weight of the lecithin. The maximum amount of preservative which can be employed in any particular instance will be determined primarily by economic considerations. In some instances, increasing the amount above the figures set out above may result in a somewhat increased storage life of the lecithin-containing dispersion or concentrate. Whether such increased storage life is justified by the increased cost of preservative is primarily a matter of economics. Increased amounts of preservatives do not generally result in a shorter storage life. In commercial operations, it is usually desirable to employ an amount of preservative somewhat in excess of the various figures given above in order to assure an adequate amount will always be present. In general, an upper limit on the amount of preservative can be set at 100% of the weight of the lecithin.

The adsorbent carrier-lecithin-preservative compositions above described find utility in forming various emulsions, particularly those for well operations. However, emulsion well fluids frequently can be given improved properties by adding other ingredients to the adsorbent carrier-lecithin-preservative compositions. For example, Lummus, 2,661,334, discloses an invert emulsion comprising about 40 to about 75 parts by volume of water, about 25 to about 60 parts by volume of oil, at least 2.5 pounds per barrel of a phosphatide (lecithin) and at least 0.1 pound per barrel of a water-soluble, non-ionic surface active agent per barrel of emulsion. Since in some instances, the water-soluble surface active agent disclosed by Lummus can be omitted, the adsorbent carrier-lecithin-preservative composition of this invention can be used as a concentrate without other ingredients therein to prepare invert emulsion well fluids simply by adding to the water and oil. In this connection, the amount of oil used can be insubstantial excess of 90 volume percent if desired. If it is desired to use the water-soluble surface active agent, it too can be adsorbed on the carrier. The same applies to any other liquid desired to be added to the concentrate. Further, other solid materials such as salts, magnesium oxide, etc. can be mixed with the adsorbent carrier-lecithin-preservative composition of this invention. As will be more fully explained below, the addition of other ingredients to the adsorbent carrier-lecithin-preservative composition does not seem to affect either the decomposition or the preservation of the lecithin.

Before turning to a description of the adsorbent carrier, the subject matter of the above-identified copending applications will be briefly discussed since this invention finds particular, though not exclusive, use therewith. Thus, the co-pending applications set forth three preferred formulae of the concentrate which is used to prepare the invert emulsion well fluid. These formulae, in order of decreasing preference, are as follows:

FORMULA I

| Ingredients: | Parts by weight |
|---|---|
| Adsorptive clay (Xact 811) | 16 |
| Perlite | 6 |
| Sodium chloride | 7 |
| Alum (aluminum sulfate) | 7.8 |
| Barium chloride | 9.6 |
| Sterox CD [1] | 0.75 |
| Commercial lecithin | 5 |
| Vegetable pitch 250 | 2 |
| Petronate L | 1.5 |
| Total | 55.65 |

FORMULA II

| Ingredients: | Parts by weight |
|---|---|
| Adsorptive clay (Xact 811) | 16 |
| Sodium chloride | 7 |
| Alum (aluminum sulfate) | 7.8 |
| Barium chloride | 9.6 |
| Sterox CD [1] | 1.5 |
| Commercial lecithin | 4 |
| Total | 45.9 |

FORMULA III

| Ingredients: | Parts by weight |
|---|---|
| Adsorptive clay (Xact 811) | 16 |
| Sodium chloride | 7 |
| Sterox CD [1] | 11.5 |
| Commercial lecithin | 4 |
| Calcium chloride | 15 |
| Total | 43.5 |

[1] Polyoxyethylene ester.

The ingredients in the above formulae are on an anhydrous basis except that the alum has been weighed as $Al_2(SO_4)_3 \cdot 14H_2O$ and the barium chloride as $BaCl_2 \cdot 2H_2O$, which are chemically equivalent to 3.5 parts of aluminum chloride, assuming complete reaction between the alum and barium chloride. Also, the figures in the right hand columns can be considered as pounds of the respective ingredients per barrel (42 gallons) of combined volume of the oil and water when a predetermined amount of each formula equal to the sum of the ingredients (57.65, 45.9, and 43.5, respectively) is added to each barrel of combined water and oil. Since it is more convenient and meaningful to speak in terms of pounds per barrel of the ingredients, such practice will be adhered to in this specification and claims.

As indicated above, it is not necessary to have all the ingredients of the above formulae present before the lecithin decomposes in the absence of a preservative. For example, lecithin has decomposed in each of the above formulae in the absence of a preservative so that it can be seen, by comparing the formulae, that most of the ingredients have no effect on decomposition of the lecithin. The lecithin will also decompose in the absence of the Sterox CD in a formula otherwise containing only the adsorptive clay and the inorganic salts. The decomposition or deterioration of the emulsifying or emulsion stabilizing powers of the lecithin is apparently due to its being dispersed on a carrier having considerable adsorptive powers or a considerable surface area per unit volume. Since the other ingredients of the various concentrates do not seem either to prevent the lecithin from decomposing or to cause it to decompose, further description thereof in this application will not be given. However, reference is made to the other two applications for such description and also to Lummus, 2,661,334, for a disclosure of the general type of invert emulsion which these concentrates can be used to compound.

The adsorptive carrier, which usually is a clay or mineral, upon which the lecithin is dispersed should have sufficient adsorptive powers to permit, with reasonable minimum concentrations of carrier, adsorption on the carrier of the lecithin. Where other liquid ingredients are also used, the carrier should have sufficient powers to adsorb these also. The extent of adsorption should be such that the resulting mixture is dry and is not gummy or lumpy. Generally, the operable clays or minerals which are to be used when the concentrate is to be employed to form an invert emulsion should be those which have sufficient adsorptive powers to yield a dry, free-flowing concentrate when a reasonable amount of the clay or mineral is employed (at least 10 pounds per barrel and preferably 10 to 25 pounds per barrel of emulsion when a predetermined weight of concentrate containing at least 10 pounds of clay is added to the emulsion) and which clay or mineral results in a concentrate capable of forming and imparting satisfactory mud properties to the water-in-oil emulsion mud.

Among the clays which have been found satisfactory for use in concentrates from which invert emulsions are to be prepared is Angelina County filter clay (sold under the trademark "Xact 811"). It is found in pits in Angelina County, Texas, such as those approximately eight miles south of Zavalla, Texas, and then one and one-half miles west of U.S. Highway 69. Such pits are on the G. W. Norton estate and the J. C. Everitt survey, and they are so identified on the official survey plats. This clay is characterized by a very low yield (substantially non-hydratable) and has considerable adsorptive powers. It has been found to result in dry free-flowing concentrate with a minimum amount of clay present (at least 2.5 parts by weight of clay per part by weight of the total of the liquid ingredients present in the concentrate).

Another clay which has been found to be satisfactory for invert emulsion concentrates, though to a lesser extent than Angelina County filter clay, is an adsorptive clay comprising predominately calcium montmorillonite (sold under the trademark "Xact") and found, for example, in Angelina County, Texas, on the W. C. Stanley survey, approximately seven miles due south of Zavalla, Texas. It is classed as a drilling fluid clay and one having a higher yield than Angelina County filter clay. Diatomaceous earth and kaolin can also be used. Bentonite is also operable to produce a dry free-flowing concentrate but, being highly hydratable, is not as preferred. Other clays which have been found to be satisfactory in many instances are those sold under the name "Borocco" and under the trademark "Hi-Yield." Each of these clays is a relatively low yield clay, such as calcium montmorillonite, which by chemical treatment has been upgraded to increase its yield. Also found satisfactory is a clay sold under the name "Attasorb." This clay is an ultra-fine (90–95% by weight finer than 10 microns) sorptive calcined attapulgite (a fuller's earth), described chemically as a complex hydrated magnesium aluminum silicate having an approximate chemical analysis (volatile free basis) as follows:

| | Percent |
|---|---|
| $SiO_2$ | 67.0 |
| $Al_2O_3$ | 12.5 |
| MgO | 11.0 |
| $Fe_2O_3$ | 4.0 |
| CaO | 2.5 |
| Other | 3.0 |

It has a pH within a range of 7.5–8.5 and an oil absorption index of 125–130 by the ASTM rub-out method.

While the problem of lecithin preservation has been made particularly apparent when working with the above concentrates, it exists also when lecithin is dispersed on any solid adsorptive carrier which may or may not be finely ground. As pointed out above, the resulting dispersion may or may not have other ingredients, solid or liquid, admixed therewith or adsorbed thereon to suit it for purposes other than forming an invert emulsion fluid. For example, lecithin may be dispersed on a clay for the ultimate preparation of emulsions for use in other than well operations. It can also be dispersed on clay for use in preparing oil base muds. Hence, the invention is applicable to preserve lecithin dispersed on any adsorptive carrier whether or not other ingredients are admixed therewith and whether or not the carrier is suitable for use in making up invert emulsion well fluids. For example, when lecithin is dispersed on ground oyster shell (calcium carbonate), bleaching clay, barytes, attapulgite (uncalcined), volcanic ash, filter clays, and others, it likewise will decompose during storage in the absence of a preservative. All or some of these carriers may or may not be useful in preparing invert emulsion concentrates but nevertheless, they can be used in accordance with this invention as carriers for preserved lecithin for ultimate consumption in forming various emulsions.

As indicated above, it is preferred that at least 2.5 pounds of solid carrier be used per pound of liquid (including the lecithin) to be absorbed thereon. Increasing the amount of carrier above this figure may in some cases result in a somewhat more flowable product. Reasonable excesses of carrier are not detrimental to the preservation of the lecithin but they may be objectionable in the final fluid product and in any event, they add to shipping expenses. When a concentrate is to be used to prepare emulsion well fluids, it is preferred that the amount of the carrier in the concentrate be such that when a predetermined amount of the concentrate is added to the fluid, the latter will contain at least 10 pounds per barrel of the carrier. The fluid, with the same amount of concentrate added should contain at least 2.5 pounds per barrel of commercial lecithin or an equivalent amount of pure lecithin. In the concentrates for preparing invert emulsion or oil base well fluids, it is preferred that the inorganic salts comprise water-soluble salts, such as the chlorides, bromides, fluorides, sulfates, nitrates, etc., of heavy metals in which the metals exhibit a valence of three or higher. These metals may be, for example, selected from the group consisting of zirconium, tin, titanium, molybdenum, iron, vanadium, cobalt and aluminum. They are most preferably from the group consisting of inorganic salts which, when the emulsion is formed, interact to form in situ water-soluble stable salts of zirconium, tin, and aluminum and a water-insoluble precipitant. For example, barium chloride and alum react in situ to form aluminum chloride and insoluble barium sulfate.

Less preferred salts for the above concentrates are the water-soluble alkaline earth metal, such as calcium, barium, magnesium, strontium, etc., halides, sulfates, nitrates, and the like. Alkali metal halides are also preferably used in combination with the heavy metal salts or the alkaline earth metal salts.

The amount of the salt (excluding the alkali metal halide) employed should be sufficient to impart increased stability to the invert emulsion formed from the concentrate. Thus, at least 1 and preferably at least 3 pounds of the heavy metal or alkaline earth metal salts per barrel of emulsion is to be employed. Generally increasing the amount of the selected salt will increase the stability of the mud and usually the upper limit of the salt concentration will be dictated by economics. It has been found that a salt concentration within the range of 1 to 15, preferably 3 to 10, pounds per barrel of emulsion will be satisfactory.

Where the alkali metal halide is to be used, its concentration in the concentrate should be such as to give a concentration in the emulsion of from 3 to 10 pounds per barrel.

*Illustrative data*

Dry concentrates were prepared by admixing 4 to 5 parts of commercial lecithin with about 16 parts of filter clay (Xact 811) to obtain dry free-flowing mixes. The indicated preservative had previously been mixed with the lecithin in the amount shown based on the weight of the lecithin. Various of the mixes also contained other ingredients such as 7 parts of sodium chloride, 0.75 to 1.5 parts of Sterox CD, 7.8 parts of alum, 9.6 parts of barium chloride and other ingredients listed in Formulae I, II and III above. All of these other ingredients were not present in every mix. No differences were noted in the stability of the lecithin dispersed on the clay when various ones of these other ingredients were added or omitted. After the various mixes had been compounded, they were placed in individual sealed containers and allowed to age. For each preservative, one sample of mix was aged at room temperature (approximately 70° F.) and another at 110° F. At monthly or bimonthly intervals, a portion of each mix sample was removed and an invert emulsion prepared with the same. Such emulsions contained 40 volume percent diesel oil, 60 volume percent of fresh water, and about 40 pounds per barrel of the sample mix. The properties of the emulsions were measured according to API Code 29. A preservative was considered to have been unsatisfactory when the emulsion exhibited a fluid loss of 2.0 ml. or more when prepared from a mix that had been aged less than 6 months.

TABLE I

| Preservative—Type and Amount | Months of Aging Before Fluid Loss Exceeded 2.0 ml. | |
|---|---|---|
| | Room Temp. | 110° F. |
| 8.8% o-phenylphenol | Over 18 | 11 |
| 10.0% o-phenylphenol | Over 17 | Over 17 |
| 2.0% m-phenylphenol | Over 16 | 13 |
| 1.0% m-phenylphenol | Over 16 | Over 16 |
| 5.0% m-phenylphenol | Over 16 | Over 16 |
| 10.0% m-phenylphenol | Over 16 | 13 |
| 2.0% p-phenylphenol | Over 16 | 14 |
| 1.0% p-phenylphenol | Over 16 | 12 |
| 5.0% p-phenylphenol | Over 16 | Over 15 |
| 10.0% p-phenylphenol | Over 16 | Over 16 |
| 1.0% sodium o-phenylphenol | Over 11 | Over 11 |
| 5.0% sodium o-phenylphenol | Over 11 | Over 11 |
| 10% sodium o-phenylphenol | Over 11 | Over 11 |
| 1.0% p,p'-isopropylidenediphenol | Over 16 | 12 |
| 2.0% p,p'-isopropylidenediphenol | Over 16 | Over 16 |
| 5.0% p,p'-isopropylidenediphenol | Over 16 | Over 16 |
| 10% p,p'-isopropylidenediphenol | Over 16 | Over 16 |
| 1.0% phenol | 10 | 10 |
| 2.0% phenol | 14 | 12 |
| 5.0% phenol | 12 | 8 |
| 10.0% phenol | Over 16 | 10 |
| 1.0% phenyl mercaptan | Over 15 | 11 |
| 2.0% phenyl mercaptan | Over 15 | 11 |
| 5.0% phenyl mercaptan | Over 15 | Over 15 |
| 10.0% phenyl mercaptan | Over 15 | Over 15 |
| Mixture of mono-, di- and tri-(alphamethylbenzyl)phenol: | | |
| 1.0% | Over 16 | Over 16 |
| 2.0% | Over 16 | Over 16 |
| 5.0% | Over 16 | Over 16 |
| 10.0% | Over 16 | Over 16 |
| p-amino phenol: | | |
| 0.2% | Over 11 | Over 11 |
| 5.0% | Over 10 | Over 10 |
| 10.0% | Over 10 | Over 10 |
| Octylphenol: 0.2% | Over 10 | Over 10 |
| N,N',N''-trichloro-2,4,6-tri-amine-1,3,5-triazine: | | |
| 0.2% | Over 11 | Over 11 |
| 1.0% | Over 11 | Over 11 |
| 1,2,4-hexylresorcinol: | | |
| 1.0% | Over 16 | 12 |
| 2.0% | Over 16 | Over 16 |
| 10% phenyl mercuric acetate, 50% potassium o-phenylphenate, 40% inert solvent: | | |
| 5.0% | Over 15 | Over 15 |
| 10.5% | Over 15 | Over 15 |
| 45% tricresyl phosphate, 55% inert other: | | |
| 5.0% | Over 14 | Over 13 |
| 10.0% | Over 14 | Over 13 |
| 2,2'-methylenebis(4-ethyl-6-tert-butyl phenol): | | |
| 0.5% | Over 11 | Over 11 |
| 2,3,4,6-tetrachlorophenol: 10.0% | Over 6 | 6 |
| Creosote: 20.0% | 8 | 7 |
| O-benzyl-p-chlorophenol: | | |
| 1.0% | Over 14 | Over 13 |
| 2.0% | Over 14 | Over 13 |
| 5.0% | Over 14 | Over 13 |
| Dihydroxydichlorodiphenylmethane: | | |
| 5.0% | Over 12 | Over 13 |
| 10.0% | Over 12 | Over 13 |

In Table I, the notation that a preservative had been effective for "over" a specified number of months means either that the particular sample was exhausted or that the tests were still continuing.

Without preservative, a mix containing 20 parts of filter clay (Xact 811), 13 parts of flake $CaCl_2$ (77-80% $CaCl_2$), 4 parts of lecithin and 1⅓ parts of Sterox CD exhibited a fluid loss of 21.5 ml. after aging at room temperature for slightly over 2 months.

Other compounds (bactericides, anti-oxidants or combinations thereof) were also tried. The procedure of test was as set out above with respect to Table I. The results are listed in Table II.

TABLE II

| Preservative—Type and Amount | Aging Time—Month at Which Emulsion Had Fluid Loss Greater Than 2.0 ml. | |
|---|---|---|
| | Room Temp. | 110° F. |
| 2,6-di-tert-butyl-4-methylphenol: 0.5% | 2 | 2 |
| 2,6-di-tert-butyl-p-cresol: 0.5% | 14 | 2 |
| Nonylphenol: | | |
| 0.2% | 4 | 4 |
| 0.5% | 6 | 1 |
| 2,2'-methylenebis (4-methyl-6-tert butylphenol): | | |
| 0.2% | 4 | 1 |
| 0.5% | 6 | 3 |
| Diphenylamine: | | |
| 0.2% | 9 | 3 |
| 0.5% | 16 | 2 |
| O-methoxyphenol: | | |
| 0.2% | 1 | 1 |
| 1.0% | 1 | 1 |
| 5.0% | 12 | 2 |
| 10.0% | 12 | 2 |
| 2,4,6-trichlorophenol: | | |
| 0.2% | 1 | 2 |
| 1.0% | 5 | 1 |
| 5.0% | 1 | 1 |
| 10.0% | 1 | 1 |
| 2,4,5-trichlorophenol: | | |
| 0.2% | 1 | 1 |
| 1.0% | 1 | 1 |
| 5.0% | 1 | 1 |
| 10.0% | 3 | 3 |
| Hexamethylenetetramine: | | |
| 0.2% | 1 | 2 |
| 1.0% | 1 | 4 |
| 5.0% | 1 | 3 |
| 10.0% | 1 | 4 |
| 2,2'-Thiobis(4,6-dichlorophenol): | | |
| 0.2% | 5 | 4 |
| 1.0% | 5 | 4 |
| 5.0% | 2 | 2 |
| 8.8% | 5 | 2 |
| O-benzyl-p-chlorophenol: | | |
| 0.2% | 3 | 2 |
| 1.0% | 2 | 2 |
| 5.0% | 2 | 2 |
| Pentachlorophenol: | | |
| 0.2% | 2 | 1 |
| 1.0% | 2 | 2 |
| 8.8% | 2 | 1 |

From the foregoing it will be seen that this invention is one well adapted to attain all of the ends and objects hereinabove set forth, together with other advantages which are obvious and which are inherent to the compositions and matter.

It will be understood that certain features and subcombinations are of utility and may be employed without reference to other features and subcombinations. This is contemplated by and is within the scope of the claims.

The invention having been described, what is claimed is:

1. A composition for preparing emulsion well fluids comprising lecithin dispersed on a finely-divided, solid adsorbent carrier, said carrier being present in an amount sufficient to adsorb said lecithin thereon, and a preservative also dispersed on said carrier in intimate contact with said lecithin and selected from the group consisting of (a) phenylphenol, (b) alkali metal phenylphenate, (c) para,para'-isopropylidenediphenol, (d) phenol, (e) a mixture of mono-, di- and tri-(alphamethylbenzyl) phenol, (f) phenyl mercaptan, (g) para-amino-phenol, (h) octylphenol, (i) N,N',N''-tricholro-2,4,6-triamine-1,3,5-triazine, (j) 1,2,4-hexylresorcinol, (k) a mixture of phenyl mercuric acetate and an alkali metal phenylphenate, (l) tricresyl phosphate, (m) 2,2'-methylenebis(4 - ethyl - 6-tert-butylphenol, (n) butylphenol, (o) 2,3,4,6-tetrachlorophenol, (p) creosote, (q) orthobenzylparachlorophenol, and (r) dihydroxydichlorodiphenylmethane, the selected one of preservatives (a) to (n) inclusive being present in an amount of at least 0.2 percent by weight of said lecithin, (o) in an amount of at least 10 percent by weight of said lecithin, (p) in an amount of at least 20 percent by weight of said lecithin and (q) and (r) in an amount of at least 0.1 percent by weight of said lecithin.

2. The composition of claim 1 wherein said preservative is para,para'-isopropylidenediphenol.

3. The composition of claim 1 wherein said preservative is a mixture of mono-, di- and tri-(alphamethylbenzyl) phenol.

4. The composition of claim 1 wherein said preservative is tri-cresyl phosphate.

5. The composition of claim 1 wherein said preservative is phenol.

6. A dry free flowing concentrate for preparing emulsion well fluid, said concentrate comprising adsorptive clay, a water-soluble inorganic salt for stabilizing the emulsion, lecithin dispersed on said clay and a preservative for preserving the emulsifying powers of said lecithin while the concentrate is in storage prior to use and selected from the group consisting of (a) phenylphenol, (b) alkali metal phenylphenate, (c) para,para'-isopropylidenediphenol, (d) phenol, (e) a mixture of mono-, di- and tri-(alphamethylbenzyl) phenol, (f) phenyl mercaptan, (g) para-aminophenol, (h) octylphenol, (i) N,N',N" - trichloro - 2,4,6 - triamine - 1,3,5 - triazine, (j) 1,2,4-hexylresorcinol, (k) a mixture of phenyl mercuric acetate and an alkali metal phenylphenate, (l) tricresyl phosphate, (m) 2,2'-methylenebis (4-ethyl-6-tert-butylphenol), (n) butylphenol, (o) 2,3,4,6-tetrachlorophenol, (p) creosote, (q) orthobenzylparachlorophenol, and (r) dihydroxydichlorodiphenylmethane, the selected one of preservatives (a) to (n) inclusive being present in an amount of at least 0.2 percent by weight of said lecithin, (o) in an amount of at least 10 percent by weight of said lecithin, (p) in an amount of at least 20 percent by weight of said lecithin and (q) and (r) in an amount of at least 0.1 percent by weight of said lecithin.

7. A dry, free-flowing concentrate for preparing a well fluid comprising lecithin dispersed on an adsorptive mineral having sufficient adsorptive power to adsorb said lecithin and render the concentrate dry, a water-soluble inorganic salt selected from the group consisting of alkaline earth metal salts and heavy metal salts wherein the valence of the heavy metal is at least three, and a preservative for said lecithin selected from the group consisting of (a) phenylphenol, (b) alkali metal phenylphenate, (c) para,para'-isopropylidenediphenol, (d) phenol, (e) a mixture of mono-, di- and tri-(alphamethylbenzyl) phenol, (f) phenyl mercaptan, (g) para-aminophenol, (h) octylphenol, (i) N,N',N"-trichloro-2,4,6-triamine-1,3,5-triazine, (j) 1,2,4-hexylresorcinol, (k) a mixture of phenyl mercuric acetate and an alkali metal phenylphenate, (l) tricresyl phosphate, (m) 2,2'-methylenebis (4-ethyl-6-tert-butyl-phenol), (n) butylphenol, (o) 2,3,4,6-tetrachlorophenol, (p) creosote, (q) orthobenzylparachlorophenol, and (r) dihydroxydichlorodiphenylmethane, the aforesaid ingredients being present in said concentrate in concentrations such that upon adding said concentrate to the well fluid, the resulting fluid contains at least 10 pounds per barrel of said mineral, at least 2.5 pounds per barrel of said lecithin and at least 1 pound per barrel of said salt, the selected one of said preservatives (a) to (n) inclusive being present in an amount of at least 0.2 percent by weight of said lecithin, (o) in amount of at least 10 percent by weight of said lecithin, (p) in an amount of at least 20 percent by weight of said lecithin and (q) and (r) in an amount of at least 0.1 percent by weight of said lecithin.

8. The dry, free flowing concentrate of claim 7 wherein said preservative is para,para'-isopropylidenediphenol.

9. The dry, free flowing concentrate of claim 7 wherein said preservative is a mixture of mono-, di- and tri-(alphamethylbenzyl) phenol.

10. The dry, free flowing concentrate of claim 7 wherein said preservative is tri-cresyl phosphate.

11. The dry, free flowing concentrate of claim 7 wherein said preservative is phenol.

12. A concentrate suitable for use with oil and water in preparing a water-in-oil emulsion drilling fluid, said concentrate containing a phosphatide but being sufficiently stable to permit storage for several months, comprising about 15 parts by weight of a finely divided adsorbent water-insoluble solid material, 4 parts by weight of a phosphatide, 1.5 parts by weight of a water-soluble, nonionic surface active agent, about 0.4 part by weight of orthophenylphenol and about 24.4 parts by weight of water soluble salts.

References Cited in the file of this patent

UNITED STATES PATENTS

| | | |
|---|---|---|
| 1,784,360 | Kaegebehn | Dec. 9, 1930 |
| 1,993,771 | Calcott et al. | Mar. 12, 1935 |
| 2,350,154 | Dawson et al. | May 30, 1944 |
| 2,661,334 | Lummus | Dec. 1, 1953 |
| 2,702,787 | Freeland | Feb. 23, 1955 |